(12) United States Patent
Stone et al.

(10) Patent No.: US 8,126,838 B2
(45) Date of Patent: Feb. 28, 2012

(54) SYSTEMS AND METHODS OF DEVELOPING INTUITIVE DECISION-MAKING TRAINERS

(75) Inventors: Arthur F. Stone, Oviedo, FL (US); Robert M. Knox, Winter Springs, FL (US); Ernest J. Reich, Oviedo, FL (US); Reginald H. Price, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 815 days.

(21) Appl. No.: 11/744,500

(22) Filed: May 4, 2007

(65) Prior Publication Data
US 2008/0114708 A1  May 15, 2008

Related U.S. Application Data

(60) Provisional application No. 60/828,395, filed on Oct. 6, 2006, provisional application No. 60/797,916, filed on May 5, 2006.

(51) Int. Cl.
*G06F 15/00* (2006.01)
*G06F 15/18* (2006.01)
*F41A 33/00* (2006.01)

(52) U.S. Cl. ............................................. 706/62; 434/11
(58) Field of Classification Search ................. 706/12, 706/62; 434/11
See application file for complete search history.

(56) References Cited

U.S. PATENT DOCUMENTS

| | | | | |
|---|---|---|---|---|
| H1452 H | * | 6/1995 | Kennedy | 434/322 |
| 6,053,737 A | * | 4/2000 | Babbitt et al. | 434/30 |
| 2002/0138456 A1 | * | 9/2002 | Levy et al. | 706/25 |
| 2003/0027112 A1 | * | 2/2003 | Warneke et al. | 434/167 |
| 2003/0091970 A1 | * | 5/2003 | Fast et al. | 434/322 |
| 2005/0282136 A1 | * | 12/2005 | Morariu et al. | 434/335 |
| 2006/0000305 A1 | * | 1/2006 | Payne | 74/473.1 |
| 2006/0025216 A1 | * | 2/2006 | Smith | 463/35 |
| 2006/0287024 A1 | * | 12/2006 | Griffith et al. | 463/3 |
| 2007/0048710 A1 | * | 3/2007 | Olson | 434/262 |
| 2007/0072160 A1 | * | 3/2007 | Jolly et al. | 434/262 |
| 2007/0136672 A1 | * | 6/2007 | Cooper | 715/751 |

OTHER PUBLICATIONS

Atari Incorporated, "Pong" video game, 1972, screen shot available at: http://en.wikipedia.org/wiki/Pong, accessed Mar. 22, 2010.*
Pleban, "Training and Assessment of Decision-Making Skills in Virtual Environments", Research Report 1767, Mar. 2001.*
R. Satava, "Surgical Education and Surgical Simulation", World J. Surg. 25, 1484-89, 2001.*
"Decision Skills Training: Facilitating Learning From Experience", in Linking Expertise and Naturalistic Decision Making (E. Salas and G. Klein, Eds.), pp. 37-52, 2001.*

(Continued)

*Primary Examiner* — Jeffrey A Gaffin
*Assistant Examiner* — Vincent Gonzales
(74) *Attorney, Agent, or Firm* — Schwegman, Lundberg & Woessner, P.A.

(57) ABSTRACT

Systems and methods can provide an immersive learning environment based on cognitive task analysis followed by an analysis of instructional requirements and development of an instructional strategy. One or more immersive scenarios can be created and presented via an audio/visual training structure which enables a participant to improve real-time decision making in stressful, rapidly changing circumstances.

20 Claims, 16 Drawing Sheets

OTHER PUBLICATIONS

R. Sheffield, Jet Fighter School, ch. 13, (1987) text available online at http://www.flightsimbooks.com/jfs/.*

J. Moyer, "Step-by-Step Guide to Oral History", revised 1999, available at http://dohistory.org/on_your_own/toolkit/oralHistory.html.*

Victoria Romero, Dale Berger, Michael Healy & Christopher Aberson, Using Cognitive Learning Theory to Design Effective On-line Statistics Tutorials, Behavior Research Methods. Instruments & Computers 2000, 32 (2), 246-249.

* cited by examiner

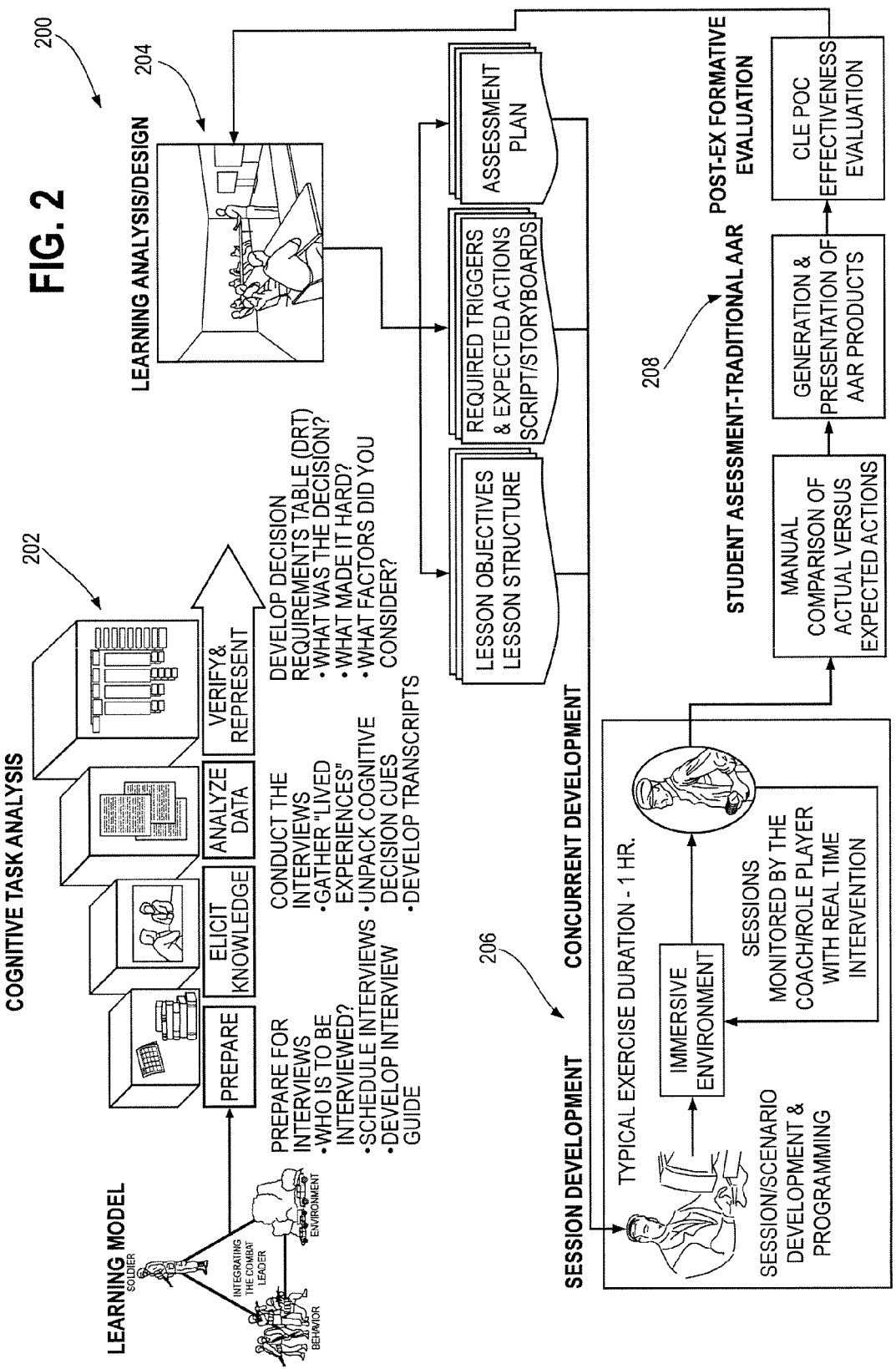

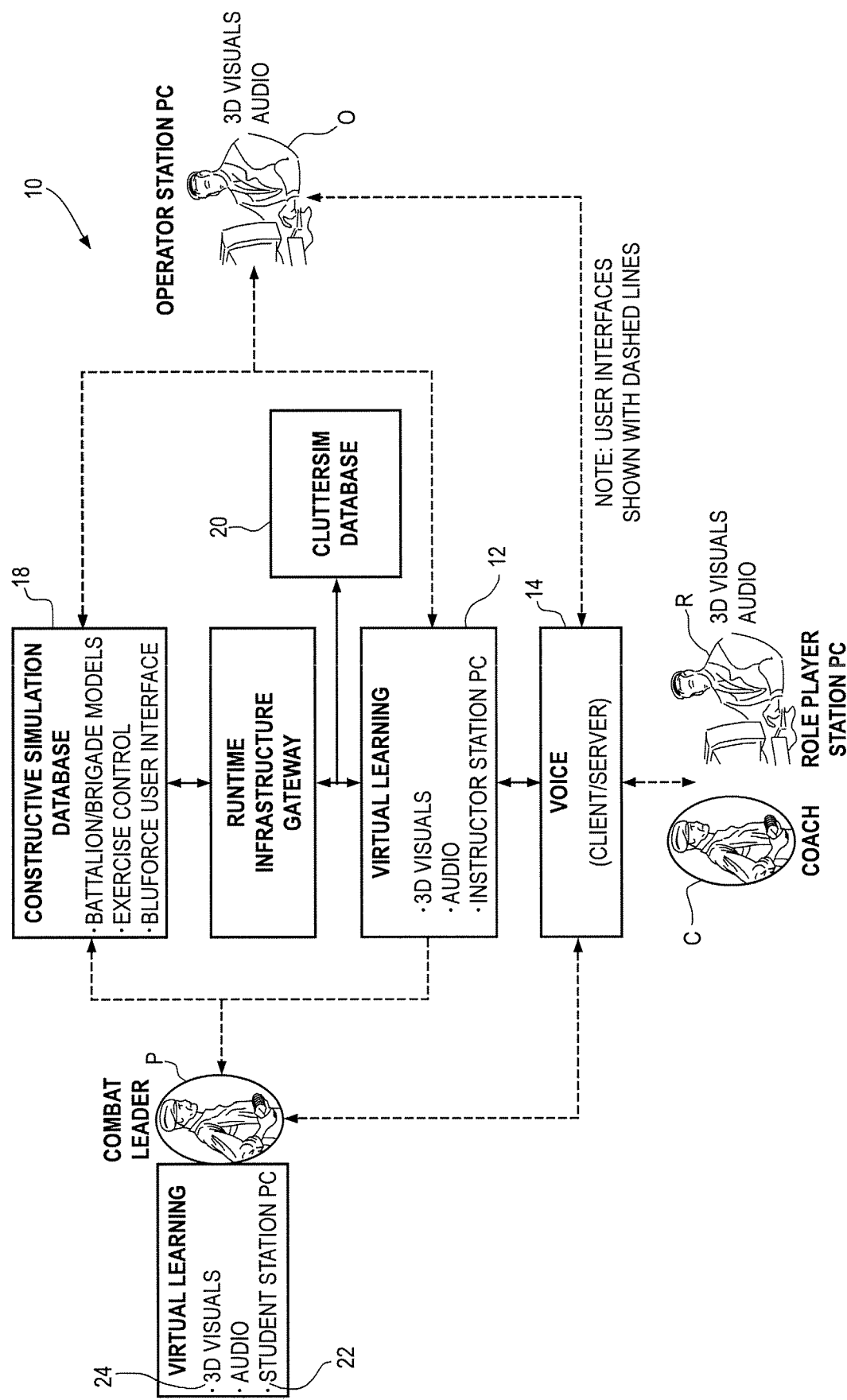

FIG. 8

TRAINING DEFINITIONS

SESSION
THE APPROXIMATELY 1 HOUR A STUDENT WILL SPEND INTERACTING WITH THE CLE AT A TIME.

SCENARIO
THE OVER ARCHING THEMES AND AREA IN WHICH THE TRAINING IS BEING CONDUCTED BROUGHT DOWN TO USER LEVEL; I.E. OPERATION IRAQI FREEDOM STABILITY OPERATIONS TIKRIT.

SITUATION
THE MISSION CONTEXT THE STUDENT IS CURRENTLY UNDER WHEN HE IS CONDUCTING AN EXERCISE. I.E. GOING TO NEGOTIATIONS WITH A MULLAH, CONDUCTING A COMPANY RAID OF AN AREA, CONDUCTING CORDON AND SEARCH MISSION.

EXERCISE
A PREDETERMINED NUMBER OF VIGNETTES GROUPED TOGETHER TO TRAIN A STUDENT WITHIN A GIVEN SCENARIO AND VARYING SITUATIONS ON THE CLE SIMULATOR DURING A SESSION OF TRAINING.

VIGNETTES
THE BASE LEVEL STORY SEGMENT USED TO SIMULATE A PARTICULAR ACTION OR EVENT TO ACHIEVE TRAINING WITHIN THE CLE. VIGNETTES WILL VARY BY TOPIC AND LEVEL OF DIFFICULTY.

TOPIC
A TERM DEFINING AN EVENT TAKING PLACE, I.E. MORTAR ATTACK, IED, CAR BOMBING, RPG ATTACK, ETC.

VIGNETTES

| EXAMPLE TOPICS | LEVEL OF DIFFICULTY |
|---|---|
| 1 - MORTAR ATTACK | A B C D E |
| 2 - EID | A B C D E |
| 3 - OP IN CONTACT | A B C D E |
| 4 - CAR BOMBING | A B C D E |
| 5 - UNIT IN CONTACT | A B C D E |
| 6 - ATTACK ON UNIT CONVOY | A B C D E |
| 7 - NEGOTIATIONS | A B C D E |
| 8 - CHECK POINT UNDER FIRE | A B C D E |
| 9 - MAYOR ASSASSINATED | A B C D E |
| 10 - CIVILIANS TURN IN WEAPONS | A B C D E |
| 11 - WEAPONS CACHE LOCATED | A B C D E |

SYNOPSIS o EXERCISES ARE RANDOMLY DRIVEN BY TOPIC AND DIFFICULTY TO TAKE PLACE INTERNAL TO A SITUATION AND SCENARIO o EACH STUDENT RECEIVES DIFFERENT EXERCISES AND DIFFERENT LEVELS o INSTRUCTOR OPERATOR DETERMINES STUDENTS ADVANCEMENT BASED ON PERFORMANCE FOR EACH VIGNETTE o VIGNETTES VARY IN LENGTH AND BY DIFFICULTY BASED ON TOPIC o POTENTIAL TOPIC AREAS ARE UNLIMITED o METHODOLOGY CAN BE USED IN ANY OPERATIONAL SETTING IN ANY THEATER.

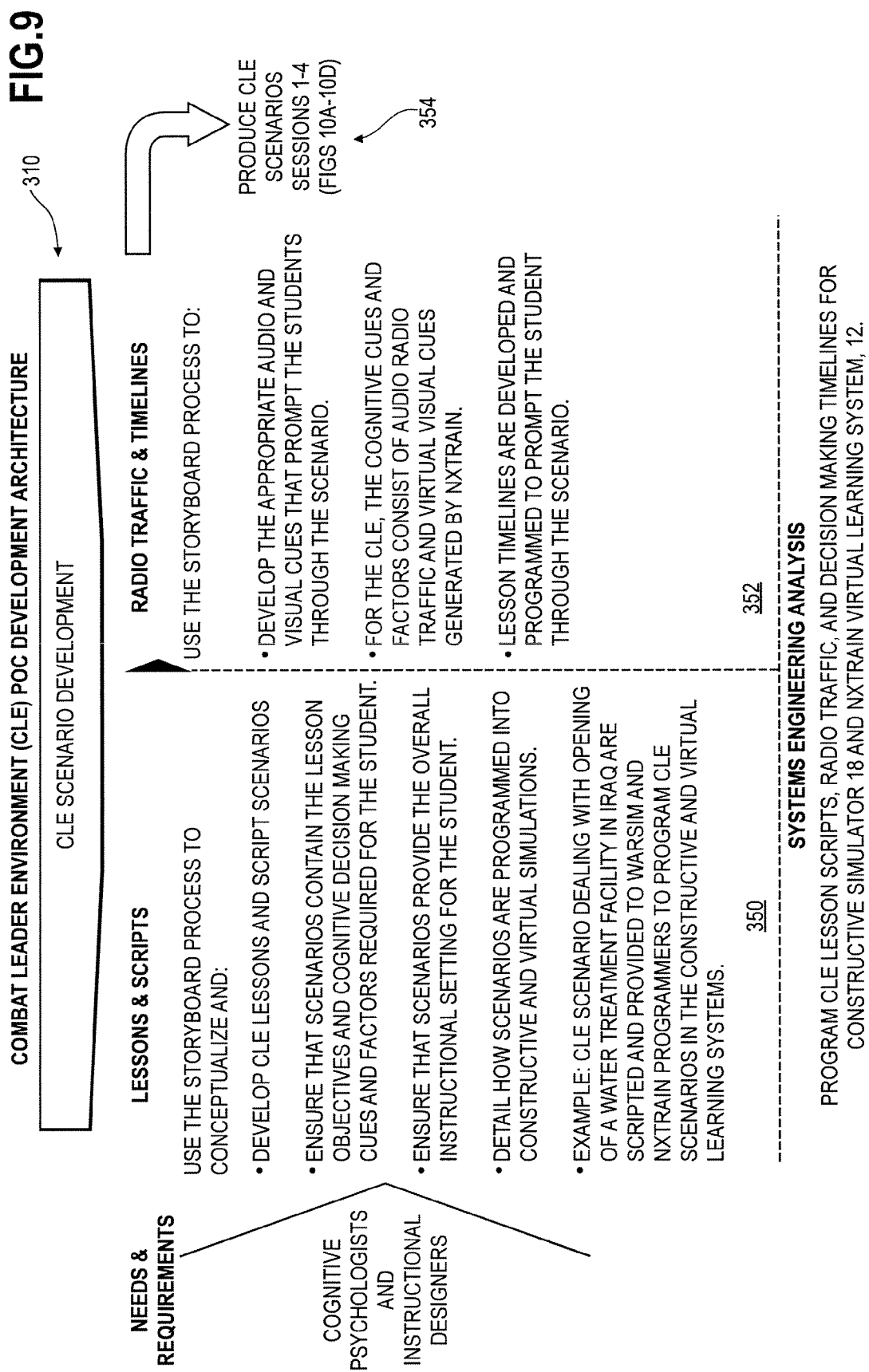

FIG. 10A
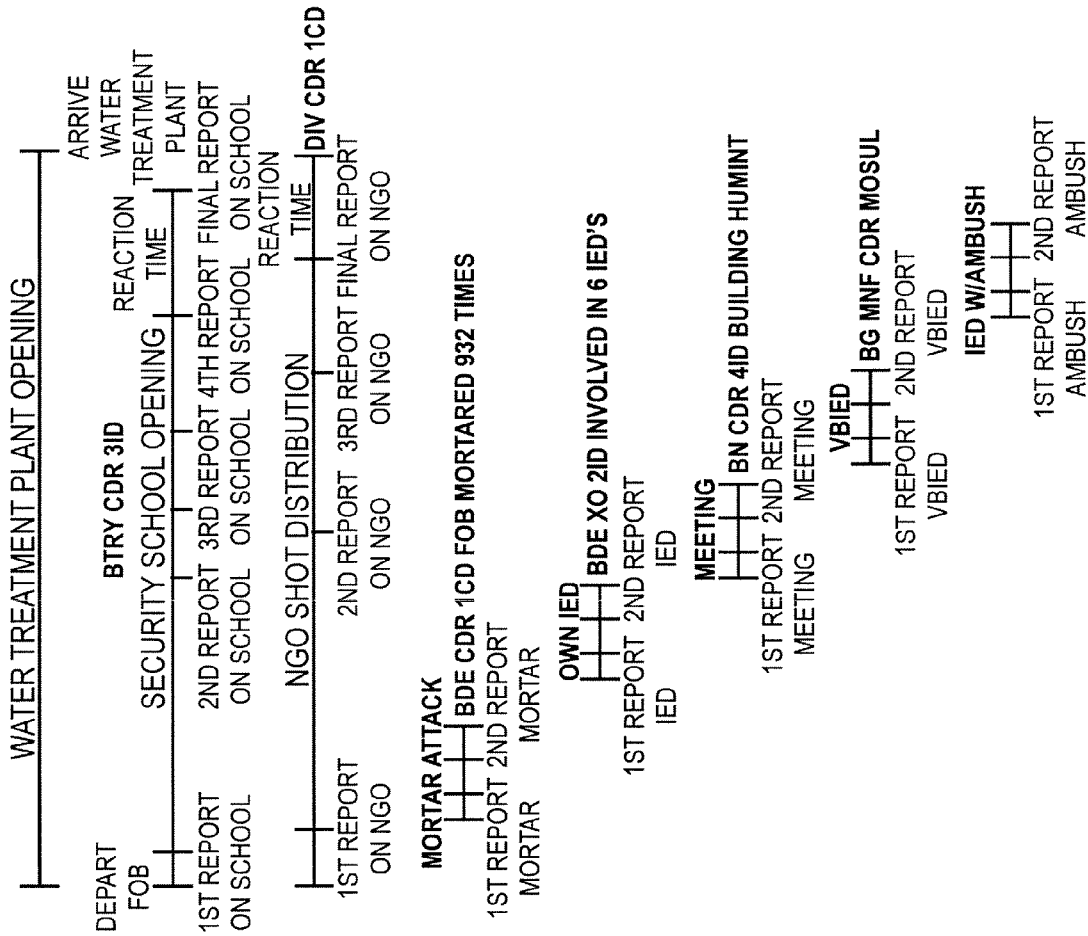
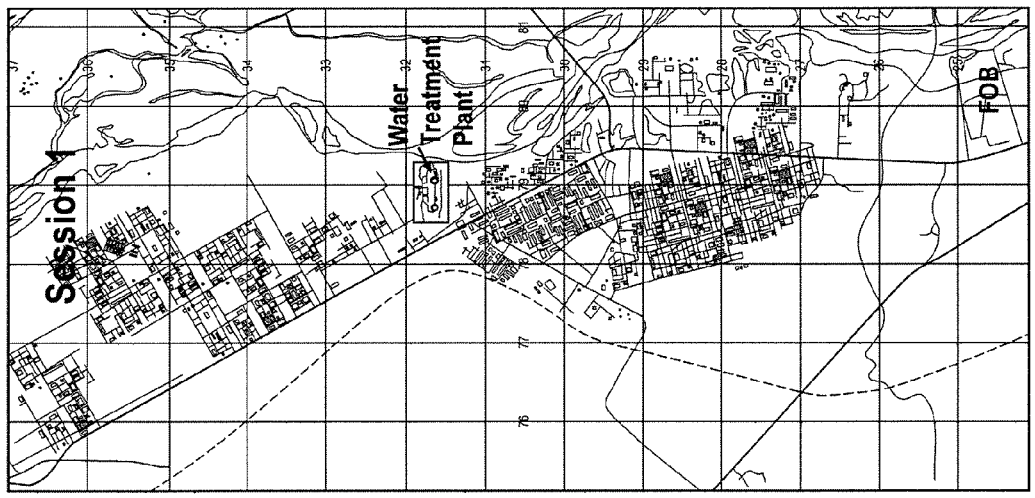

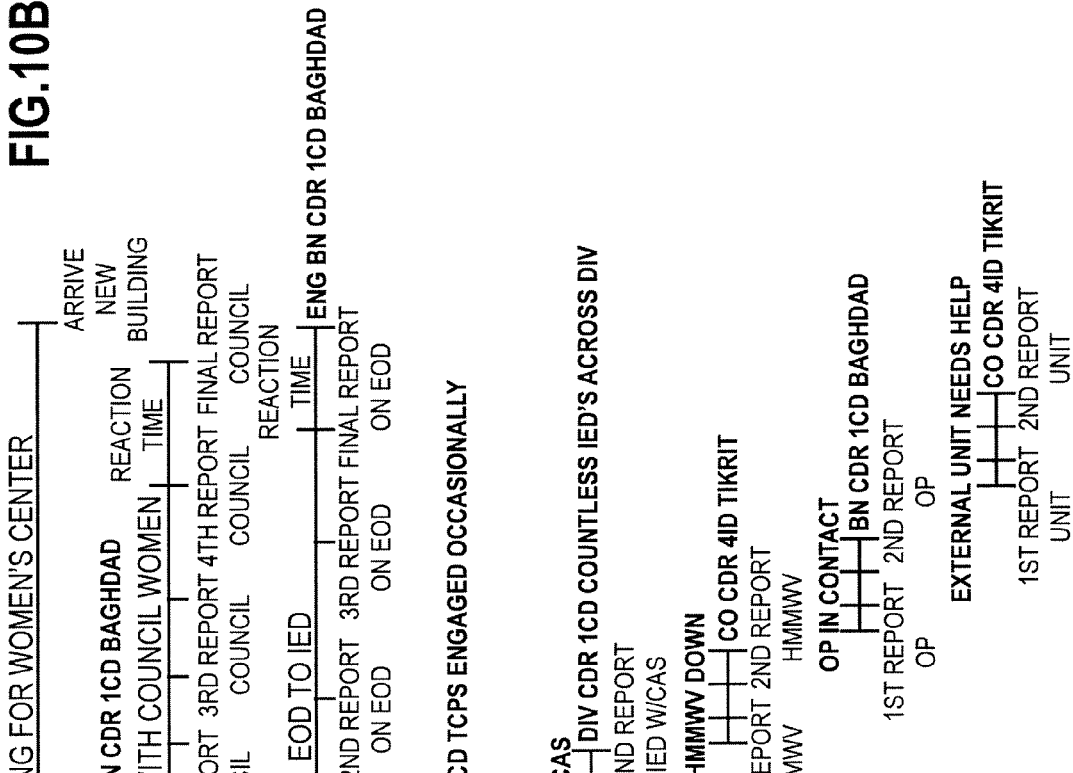
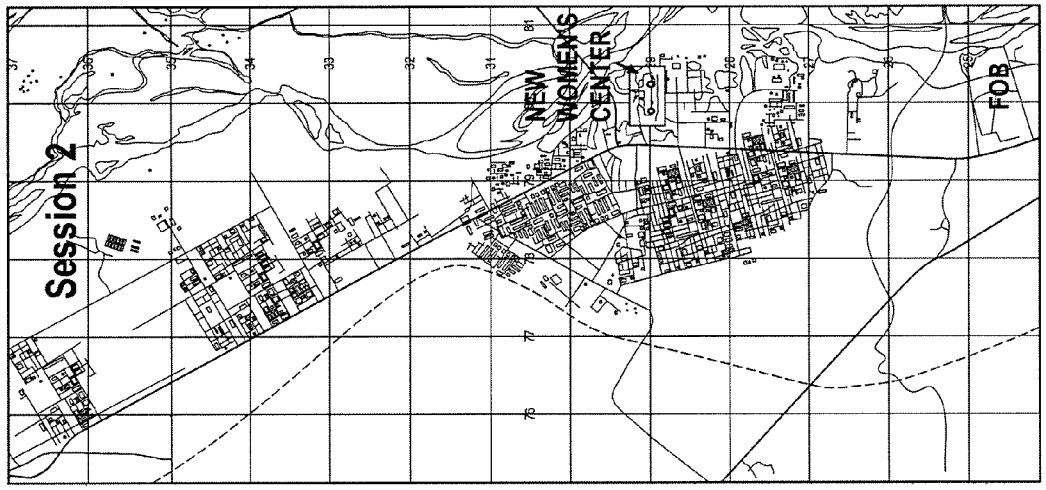
FIG.10B

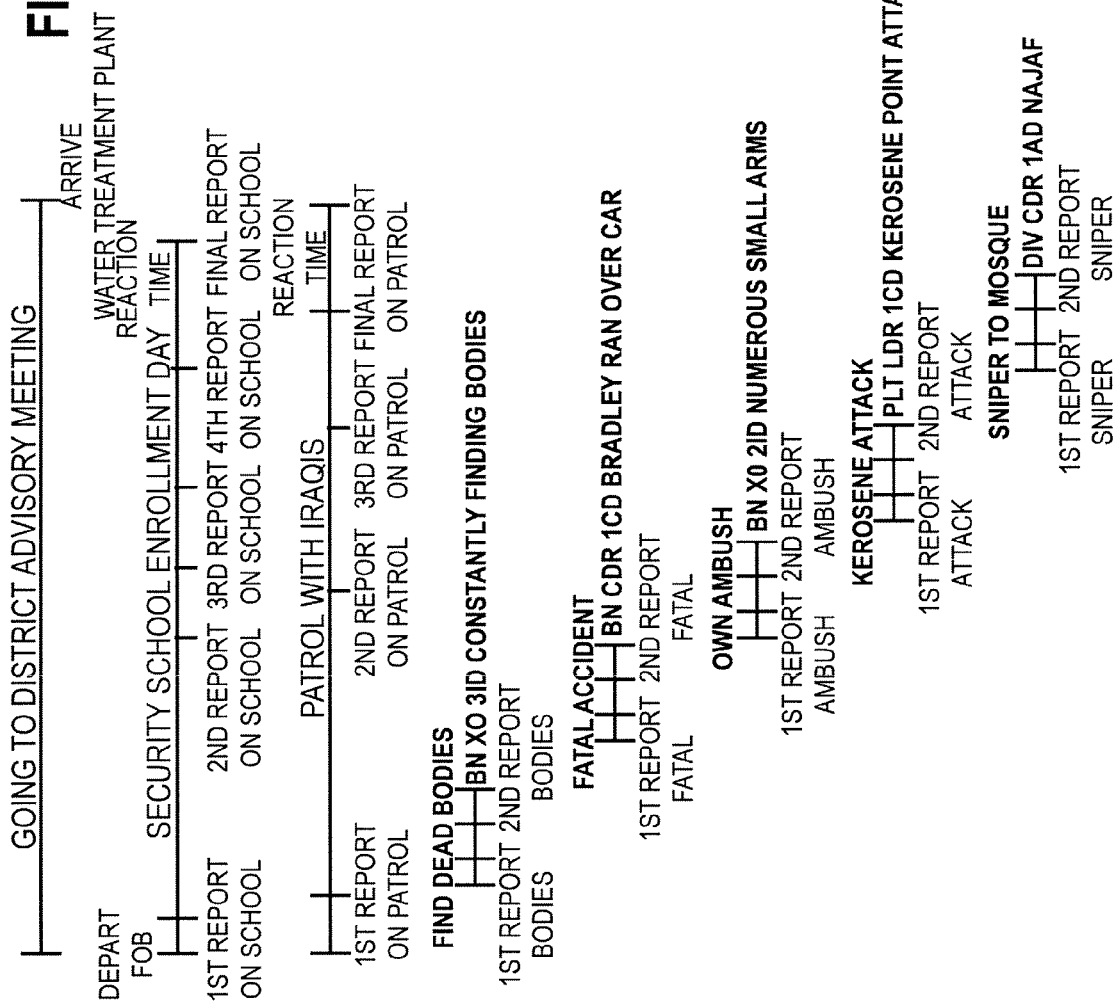
FIG.10C
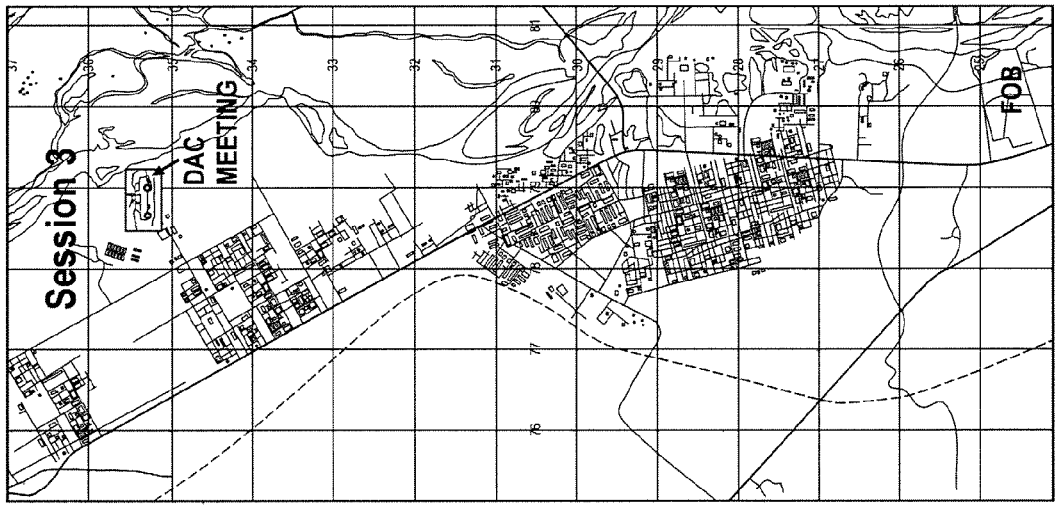

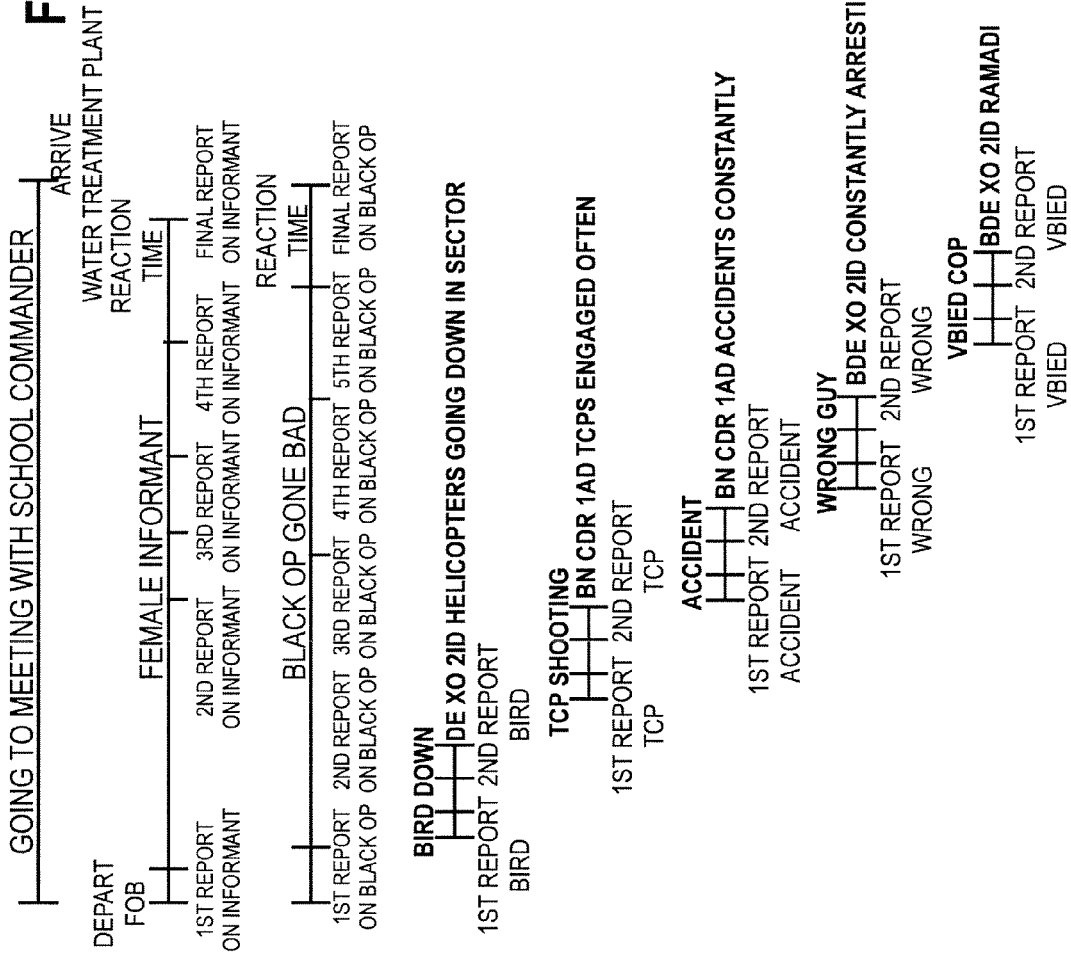
FIG.10D
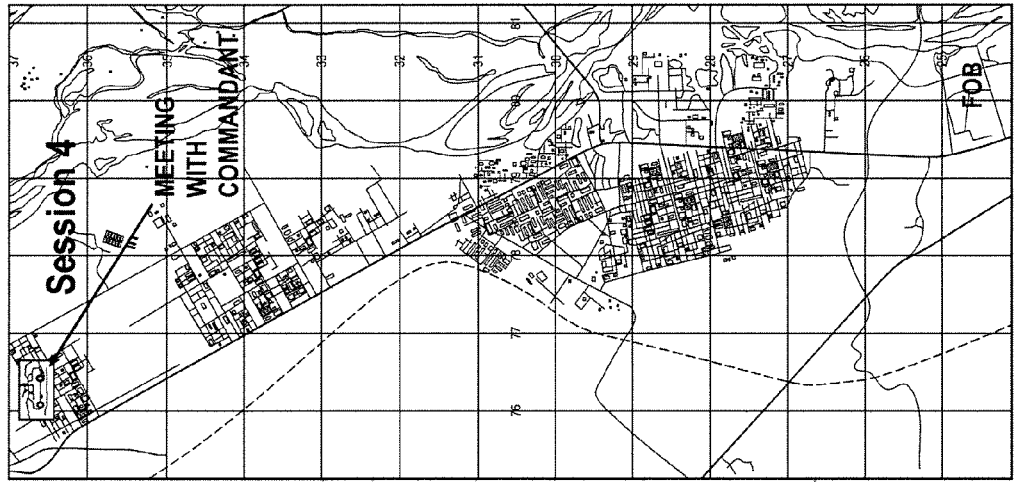

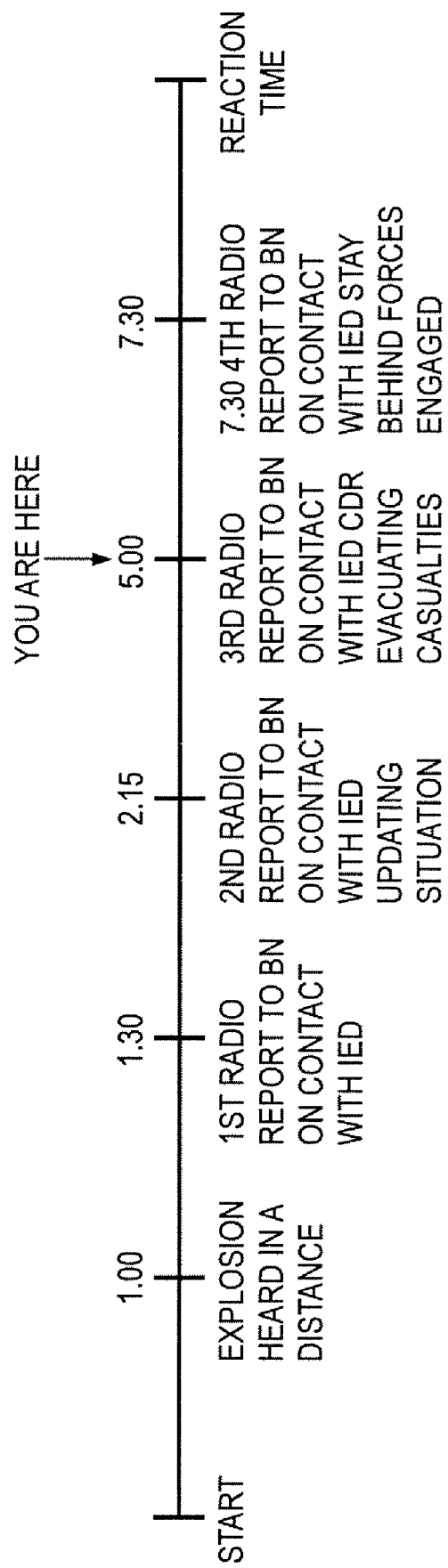

FIG. 11B

TOPIC RADIO TRANSMISSIONS
IED WITH DELAYED AMBUSH

1ST TRANSMISSION 1.30 MINUTES INTO TOPIC: WARRIOR BASE, DEATH DEALER 6 WE HAVE BEEN HIT BY AN IED, ONE VEHICLE DOWN, VICINITY GRID 785325 MORE TO FOLLOW OVER.

WARRIOR BASE ROGER

2ND TRANSMISSION 2.15 MINUTES INTO TOPIC: WARRIOR BASE, DEALER 6 WE HAVE 2 PRIORITY CASUALTIES FROM THE IED, SECURING CASUALTIES FOR EVACUATION I INTEND TO GROUND EVAC THEM TO THE FIELD HOSPITAL CO LOCATED NEAR THE BRIGADE HEADQUARTERS OVER.

WARRIOR BASE ROGER

3RD TRANSMISSION 5.00 MINUTES INTO TOPIC: WARRIOR BASE, DEATH DEALER 6 I HAVE THE CASUALTIES LOADED ON MY VEHICLE AND I AM DEPARTING AT THIS TIME, DEATH DEALER 35 IS REMAINING WITH THE DOWN VEHICLE WHILE WE ARRANGE FOR ITS EVACUATION OVER.

WARRIOR BASE ROGER

SYSTEMS AND METHODS OF DEVELOPING INTUITIVE DECISION-MAKING TRAINERS

CROSS-REFERENCE TO RELATED APPLICATION

This utility application claims the benefit of the filing date of U.S. Provisional Application Ser. No. 60/828,395 filed Oct. 6, 2006 entitled "System and Method of Simulating Combat Leader Environment" and U.S. Provisional Application Ser. No. 60/797,916 filed May 5, 2006 entitled "Combat Leader Environment Simulation System and Method" both of which are incorporated by reference.

FIELD

The invention pertains to systems and methods of designing and creating immersive, highly interactive and adaptable trainers for the development of adaptive and innovative leaders. More particularly, the invention pertains to such systems and methods which provide immersive environments designed to stimulate adaptive cognitive decision making.

BACKGROUND

Events in various parts of the world have made it apparent that adaptive, agile and innovative decision making is important in reacting to and dealing with various types of threats. Such threats can arise both in military and civilian environments.

The use of various types of simulators has been recognized as an important adjunct in the development and training of individuals, for example, in training individuals to fly civilian or military aircraft, rehearsing civilian or military missions and in the general training of individuals to carry out various types of tasks. A variety of such simulators is known.

Known simulators have been developed in the past with the intent of providing a realistic simulation of a particular activity. For example, learning to fly an aircraft, operating a tracked vehicle such as a tank or the like requires a certain combination of skills which known simulators can develop.

There is, however, a continuing need for systems and methods which provide a new and adaptive approach to training for various types of missions. For example, the skills needed to be successful in peacekeeping missions are different from those needed for civilian policing in a developed country, or in conducting anti-insurgency operations. It is would be desirable to be able to develop leaders with skills which are effective in countering an adaptive adversary. Further, there is an ongoing need to be able to readily switch behavior between addressing adverse as well as "friendly" encounters in a very short time span.

There is thus a continuing need for systems and methods that can provide immersive, highly interactive and adaptive training environments, relevant to a predetermined mission or tasks, to facilitate the development of agile, adaptive and innovative leaders. Preferably such systems and methods will assist developing leaders in thinking and acting in response to adaptive threats as well as culturally challenging peace keeping environments.

BRIEF DESCRIPTION OF THE DRAWINGS

FIG. 2 is flow diagram illustrating details of the process of FIG. 1;

FIG. 3 is a block diagram of hardware and software useable to create an environment of a type designed by the process of FIG. 2;

FIG. 8 illustrates exemplary lesson characteristics and vignettes;

FIG. 9 illustrates aspects of scenario developments;

FIGS. 10A-10D illustrates characteristics of a plurality of different sessions with which a participant can interact;

FIGS. 11A, 11B illustrate exemplary time lines and radio transmissions of incidents which might take place during any of the scenarios of FIGS. 10A-10D.

DETAILED DESCRIPTION

Figure 1:
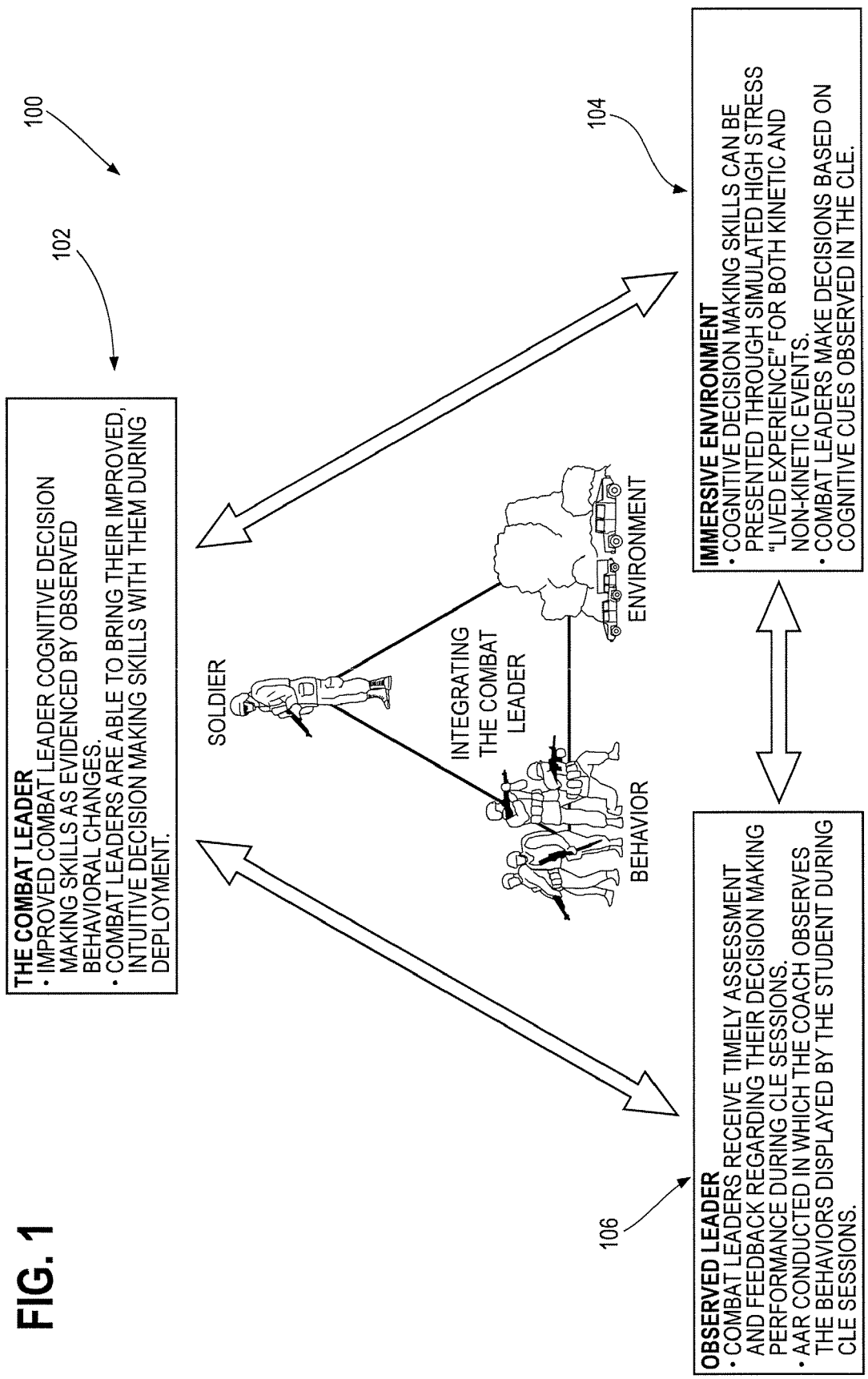
FIG. 1 is an overall diagram of a burning and decision making process in accordance with the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the invention address a process of developing leaders who can function effectively in rapidly changing, high stress situations. In this regard, systems and methods which embody the present invention support the implementation of cognitive learning development architectures. As explained below, analysis can be performed to determine the most appropriate technologies and delivery systems applicable for the presentation and the teaching of cognitive based decision making tasks.

An initial analysis can be conducted to identify cognitive decision making requirements with regard to a particular type of situation, for example, urban warfare, stability operations, port security, or long duration space flight. Interviews can be conducted with experts in the field. The interviews can produce data regarding intuitive and cognitive decisions previously made by leaders injected into such circumstances. Cognitive clues and factors associated with effective decision making processes in such circumstances can be identified.

Learning analysis based on the data collected can be used to establish a base line. An instructional strategy associated with terminal, learning, and enabling objectives as well as scenario assessment criteria can be developed. Simulation systems can be created and scripted to include event and decision making time lines, as well as communications and graphical displays to create an immersive environment which can then be experienced by one or more participants or developing leaders.

Systems and methods implemented in accordance with the invention can incorporate a variety of participants in addition to the individual experiencing the environment. These can include some or all of a coach, system operator and a role player. The components of the system, including audible and visible cues, can be used to create an immersive environment which can be controlled by the operator. The role player brings reality and depth to the environment. The coach can interact with the participant, the role player as well as the system operator in conducting one or more sessions.

By way of example, and not limitation, a variety of multi-dimensional displays can be provided for the participant which can present multi-dimensional representations of a synthetic environment. Touch screens that can be used to provide situation awareness. Headsets with integrated microphones can be used to emulate a communications network. Such controls and displays can be driven by one or more programmable processors and associated executable software which extract data from one or more pre-loaded databases to create an appropriate synthetic environment.

In another aspect of the invention, the participant can be provided with one or more scenarios based on traveling in a land vehicle, or an aircraft. Various vignettes can be presented to the participant as he/she travels through the environment in the vehicle of choice. The participant can interact audibly as well as visually with the role player during the execution of a session. The coach overseeing the simulation activity can stop the session and intervene at any point to provide feedback to the participant.

Assessment of participant performance after one or more sessions can be carried out, for example, using interview style after action reviews. The coach can also review the participant's decisions and intuitive decision making skills which were being honed and refined during the exercise.

FIG. 1 illustrates an overall process 100 set in a military environment where the participant is a developing combat leader. Objectives for such an individual, as illustrated at 102, are to improve cognitive decision making in rapidly changing adverse and non-adverse situations. Such improved decision making can be achieved through the use of a carefully designed immersive combat leader environment (CLE), as at 104 in accordance with the present invention.

High stress situations developed in accordance herewith can be presented to the participant in an appropriately designed environmental simulator. Feedback can be provided in real-time as at 106 to the participant in connection with a respective decision making performance during the environmental sessions. An after action review can be conducted with the coach to carry out further discussions.

FIG. 2 illustrates an overall process 200 which can be used to systematically develop a wide variety of highly effective training environments of which the CLE is an example. A multi-step cognitive task analysis 202 can be used to design an immersive process which incorporates a variety of different high stress scenarios to be experienced by participant as at 204.

The results of the design as at 204 can be used to implement a hardware/software implementation of an immersive environment as at 206. The environment implemented at 206 can provide the participant with a plurality of different stress inducing exercises based on the objectives and characteristics developed 204.

Sessions can be monitored in real time by a coach or role player or both. Subsequent to the exercise or exercises, various types of assessments can be carried out as at 208.

Figure 3A:
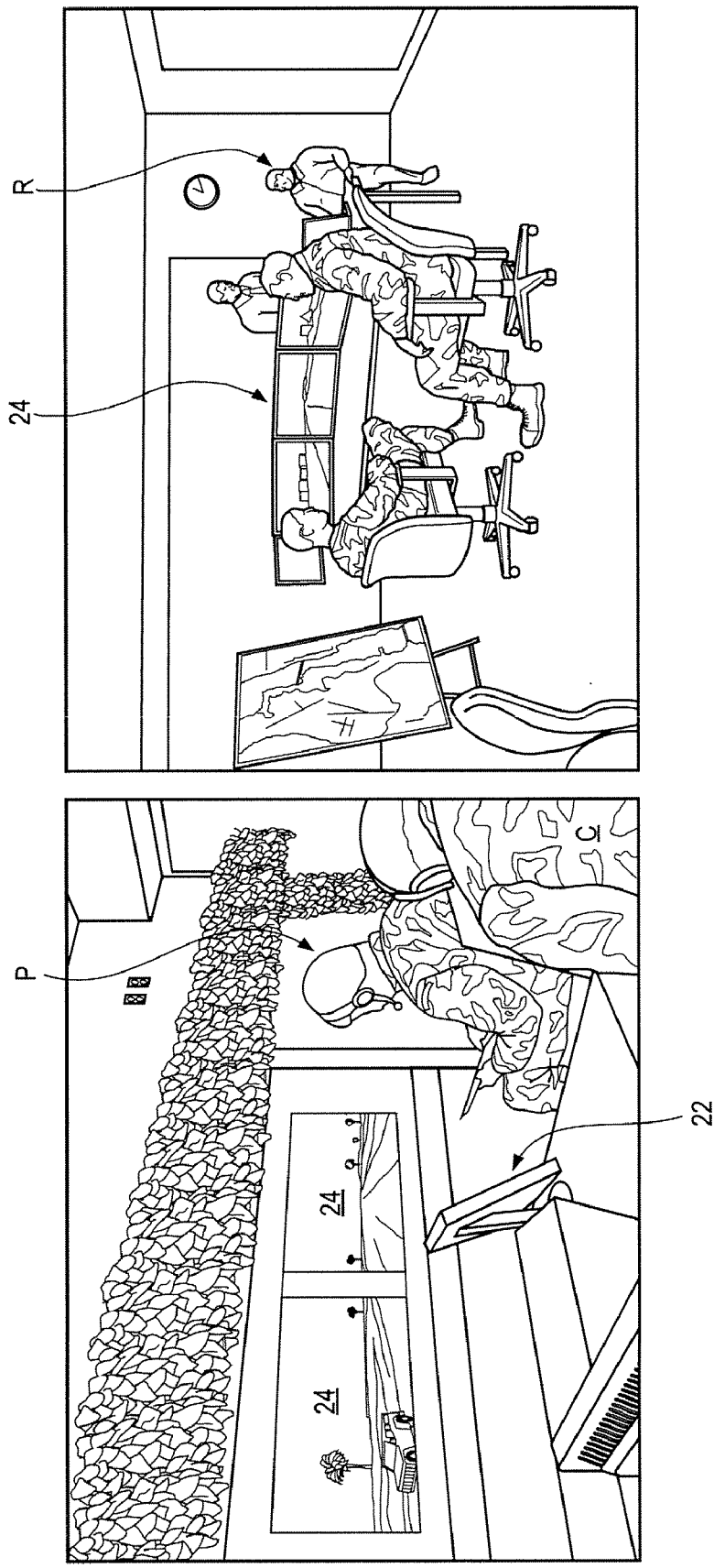
FIG. 3A an over-all diagram, illustrates additional aspects of the block diagram of FIG. 3.

FIGS. 3 and 3A illustrate an immersive exercise presenting apparatus 10, based on the method 200, where the participant P can experience a variety of scenarios including audio and visual presentations via computer driver display devices and simulated communications networks 12. Real time voice can be injected into the process via synthetic or digitized speech circuitry as at 14.

Circuitry 14 can receive real time inputs from a coach C or a role player R. An operator O can control the on-going process of the system 10. Other inputs can be provided to the participant P such as simulation of various peaceful/non-peaceful events via one or more simulators 18. The experience provided by the simulators 18 can be enhanced by providing both audible and visual clutter from a clutter simulator 20. Representative sessions can include, for example, traveling through an adverse environment and experiencing both audible and visible clues such as traffic, as well virtual visual clues presented on various displays associated with both adverse and peaceful events.

Figure 4:
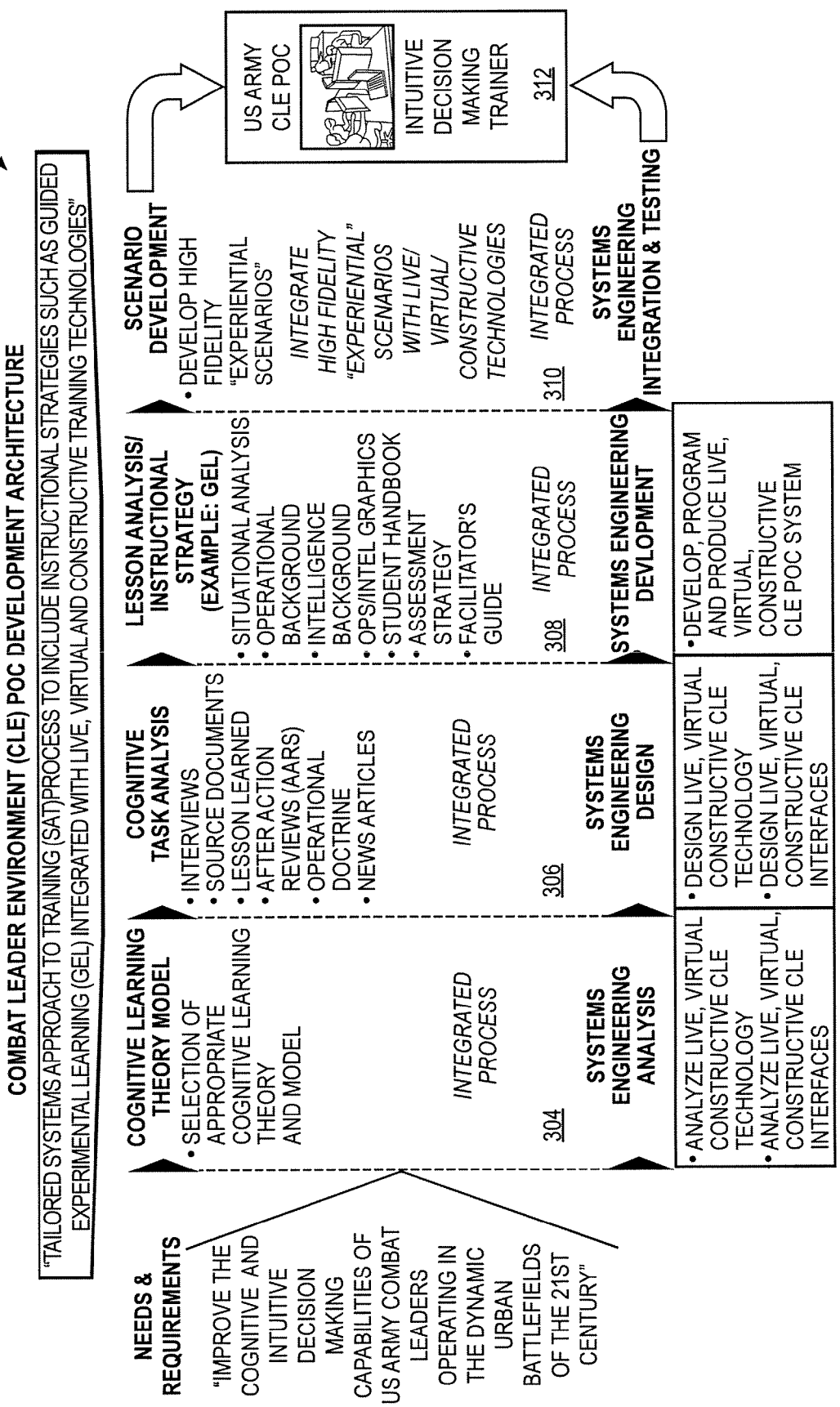
FIG. 4 illustrates additional details of the method of FIG. 2.

Additional aspects of the present invention are illustrated by a process 300, see FIG. 4. Initially, a task or need is defined, as in 302. For exemplary purposes only, the task, or need is set forth in terms of improving the decision making capabilities of military combat leaders. An appropriate cognitive learning theory and model are selected as at 304. Based on the decisions as in 304, cognitive task analysis can be carried out as at 306. In response thereto, as at 308, lesson analysis and instructional strategies can be developed. Finally, as at 310 a plurality of experiential scenarios can be developed which then define the characteristics of a relevant or related decision making trainer as at 312. The resultant simulation system or trainer 10 was previously discussed relative to FIG. 3.

Figure 5:
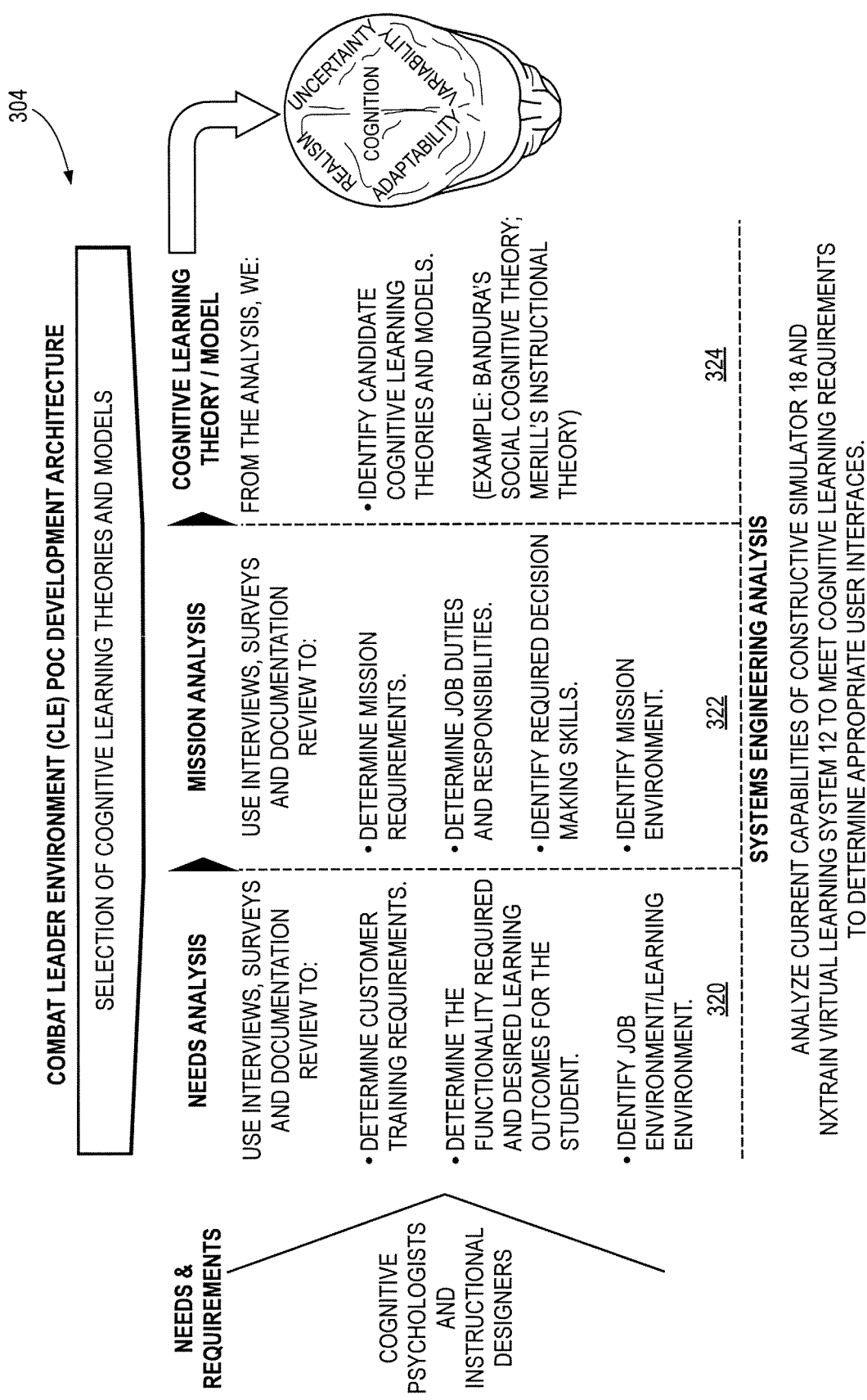
FIG. 5 illustrates additional details of the process of selecting cognitive learning theories and models.

FIG. 5 illustrates additional aspects of the selection of the cognitive learning theory and model, as at 304. Selection is carried out via a multi-element process including analyzing needs as at 320, carrying out a mission analysis as at 322 consistent with the proposed task or need, previously discussed at 302. Responsive thereto, a particular learning theory/model can be selected at 324.

Figure 6:
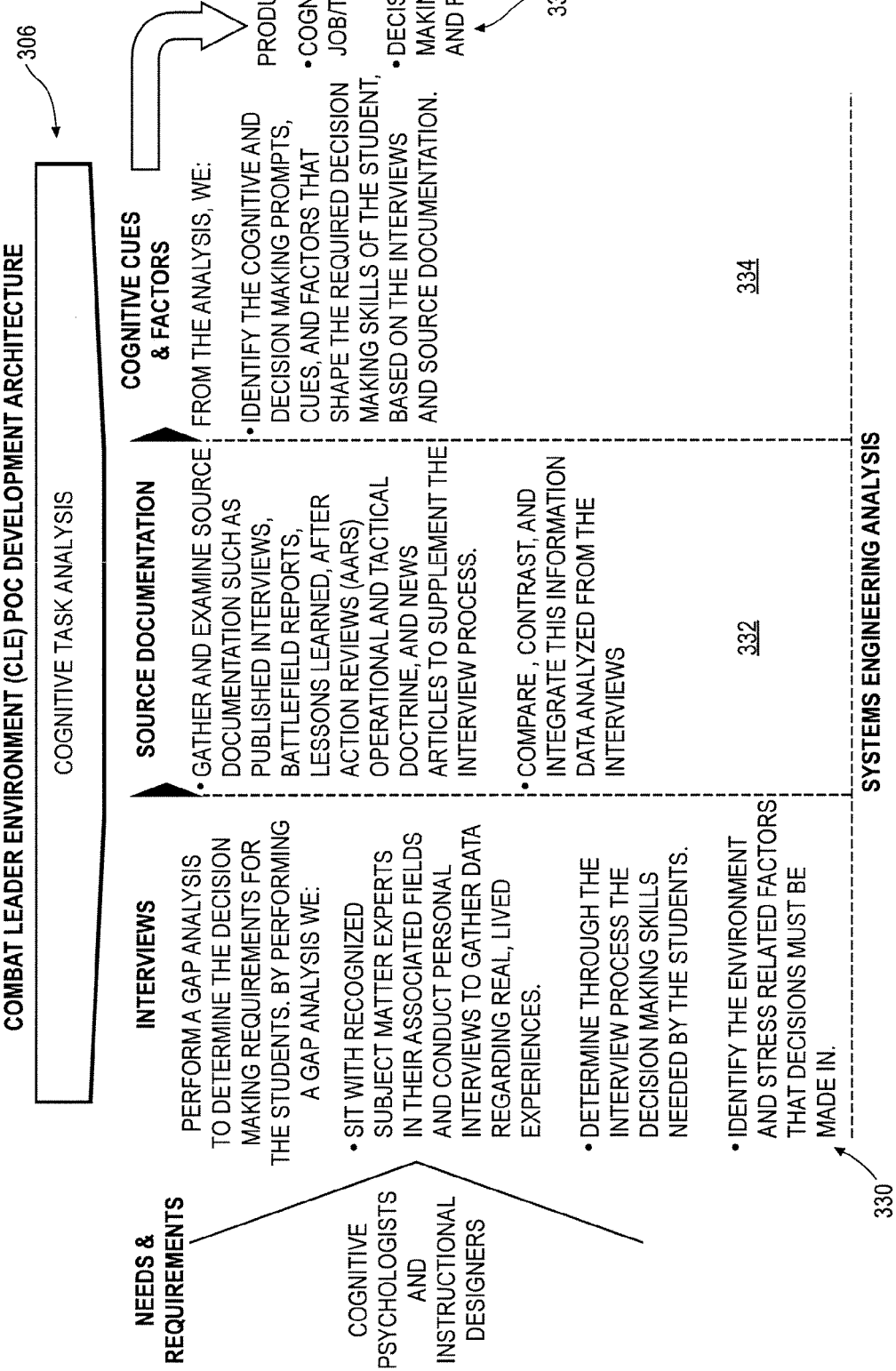
FIG. 6 illustrates additional details of the process of cognitive task analysis.

FIG. 6 illustrates various aspects of the cognitive task analysis process 306. A plurality of interviews can be conducted as of 330. Relevant source documentation can be obtained and integrated into the information and data extracted from the interviews, as at 332. Finally, responsive to the interviews and documents cognitive and decision making prompts, cues and factors can be determined as at 334. The task analysis process produces, for example, cognitive jobs/tasks lists as well as decision making cues and factors as at 336.

Figure 7:
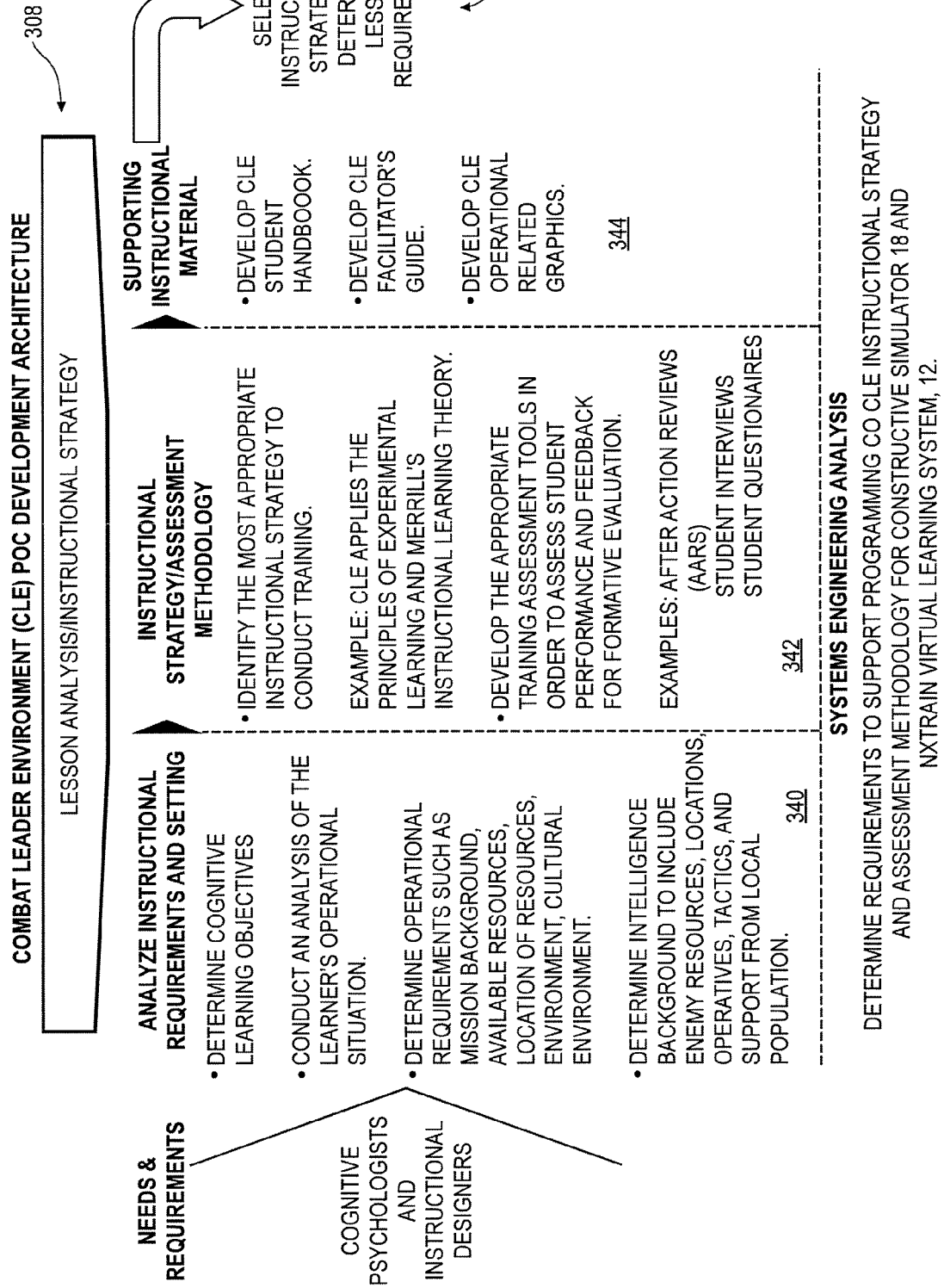
FIG. 7 illustrates additional details of the process of lesson analysis/development of an instructional strategy.

FIG. 7 illustrates additional details of the lesson analysis/instructional strategy process previously discussed as at 308. The instructional requirements setting can be analyzed as at 340. The most appropriate instructional strategy can be identified and appropriate training assessment tools can be developed as at 342. Finally, student handbook, a facilitator's or coach's guide and operational or intelligence related graphics all could be developed to support a combat leader environment (CLE) implemented by the system 10. The lesson analysis/instructional strategy 308 results in a plurality of specific instructional strategies and lesson requirements as at 346.

Responsive to the lesson analysis/instructional strategy process of FIG. 7, exemplary lesson characteristics and vignettes can be defined as illustrated in FIG. 8. FIG. 9 illustrates aspects of CLE scenario development noted above at 310. The Experiential scenarios, as illustrated in FIG. 8, incorporate scenarios, as at 350 using a story board process to develop the lessons and script scenarios. As at 352 that process can be extended to develop simulated radio traffic and activity time lines to produce the CLE scenarios as of 354. In one embodiment, the degree or level of complexity of the scenarios is designed to increase as the student succeeds in achieving the scenario objectives.

The Combat Leader Environment (CLE) is designed to provide the student the opportunity to practice critical leadership and decision making skills in a high stress immersive environment. By presenting the student with a series of virtual situations drawn from actual "lived experiences" from Operation Iraqi Freedom (OIF) that will allow the student to practice these cognitive decision making skills in an environment that promotes experimentation and learning. The CLE experience is based on the following Terminal Learning Objective (TLO):

Given an immersive, cognitively authentic learning environment, the student or participant, will be able to practice command and control and gain simulated lived experiences to enhance decision making skills.

Exemplary sessions 1-4 present the student, or participant, with "A Day in the Life of a Bn Cdr in Iraq", (best seen in FIGS. 10A-10D). The student will be presented with several items that are listed on the Bn Cdr's "To Do" list for the day. These are themed events that run through the entire session from beginning to end. As students proceed through the sessions, they will also be presented with various decision making incidents that they will have to solve along the way. These incidents can be kinetic or non-kinetic in nature, and require the application of several cognitive skills to include:

The ability to visualize the current situation
The ability to describe the current situation
The ability to provide direction through cognitive decision making
The ability to assess various situations
The ability to prioritize events and incidents
The ability determining correct courses of actions
Employing negotiation and communication skills
Employ tactical decision making skills The themes and challenges are defined by lesson and enabling objectives, and are supported by vignettes developed to support the sessions.

FIGS. 10 A-10D illustrate the details of various sessions. As illustrated in FIG. 10A, aspects and incidents associated with a water treatment plant opening provide a variety of opportunities where the participant P may have to make decisions based on limited information with short time lines. Similarly, FIG. 10B illustrates details of opening a new building for a woman's center, FIG. 10C illustrates various details of traveling to an advisory counsel meeting and FIG. 10D illustrates incidents which might take place in the process of going to a meeting with a school commandant. The following acronyms are used throughout the 4 CLE sessions as depicted in FIGS. 10A-10D:

BDE—Brigade
BDE XO—Brigade Executive Officer
BDE XO 2ID—Brigade Executive Officer 2nd Infantry Division
BN—Battalion
BN CDR 1AD—Battalion Commander 1st Armored Division
BTRY CDR 3ID—Battery Commander 3rd Infantry Division
CDR—Commander
CO CDR—Company Commander
DIV—Division
DIV CDR 1CD—Division Commander 1st Cavalry Division
FOB—Forward Operating Base
IED—Improvised Explosive Device
HUMINT—Human Intelligence
MNF—Multi-National Force
PLT LDR—Platoon Leader
TCP—Tactical Check Point
VBIED—Vehicle Born Improvised Explosive Device
XO—Executive Officer
1AD—1st Armored Division
1CD—1st Cavalry Division
2ID—2nd Infantry Division
3ID—3rd Infantry Division
4ID—4th Infantry Division FIGS. 11A, 11B illustrate exemplary time lines and radio transmissions associated with an adverse incident, an ambush, which might take place during any one of the scenarios illustrated in FIGS. 10A-10D. The following acronyms are used to highlight FIGS. 11A and 11B:

BN—Battalion
CDR—Commander
IED—Improvised Explosive Device

Subsequent to providing the participant P an opportunity to interact during one or more scenarios, feed back can be obtained therefrom via one or more questionnaires. Exemplary questions are illustrated in Exhibit A attached.

Those of skill in the art will understand that while the above discussion related to learning process associated with developing the decision making capabilities and experiences of military leaders in mixed combat/non-combat situations involving substantially different cultures, the present systems and methods are not limited. Highly immersive simulation systems, as in FIG. 3, 3A can be developed using the above-described methodologies for purposes of developing leadership skills for carrying out peacekeeping or stability operations, engaging in various aspects of urban warfare, providing domestic protection from various threats, port security as well as long duration space flights.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method for enhancing and assessing decision making skills of a participant in a conflict environment via a simulator, the method comprising:

identifying a plurality of cognitive tasks for a desired training environment;

selecting a learning model that at least in part identifies an assessment methodology for assessing the participant during a simulated conflict scenario comprising a plurality of simulation events in the training environment, wherein the learning model is selected from candidate learning theories and models based on a needs analysis and mission analysis;

identifying a plurality of intuitive decision making skills associated with the cognitive tasks, wherein each intuitive decision making skill is assessable based on a decision of the participant upon exposure to a corresponding simulation event of the plurality of simulation events that includes a plurality of cues which are presented to the participant, wherein at least one of the plurality of cues is an audio cue;

identifying the plurality of cues associated with the corresponding simulation event based on a plurality of actual cues from a real-world event which is being simulated by the corresponding simulation event;

responsive to the identifying the plurality of cues, developing an instructional strategy with integrated live, virtual and constructive training interfaces;

using the instructional strategy, and creating the simulated conflict scenario based on the identified intuitive decision making skills;

providing a plurality of interconnected hardware elements which implements the simulated conflict scenario for the participant;

running the simulated conflict scenario with the participant;

assessing the performance of the participant in the decisions made; and assessing the intuitive decision making skills demonstrated during the simulation by identifying cognitive clues and factors associated with decisions made during the simulation.

2. A method as in claim 1 where providing includes providing at least one multidimensional display device and an associated communications network.

3. A method as in claim 2 where providing further includes presenting on the display device at least one image sequence in accordance with the simulated conflict scenario.

4. A method as in claim 3 which includes generating a plurality of messages and communicating them via the network.

5. A method as in claim 1 where selecting includes evaluating at least two different learning models.

6. A method as in claim 1 where identifying the plurality of cues includes at least some of conducting interviews, reviewing documents, evaluating after action reviews, and considering operational doctrine.

7. A method as in claim 1 where developing includes analyzing instructional requirements and identifying the instructional strategy.

8. A method as in claim 7 where analyzing instructional requirements includes at least some of determining cognitive learning objectives, conducting an analysis of a participant's operational situation, determining operations requirements.

9. A method as in claim 1 where identifying the plurality of intuitive decision making skills includes at least some of consulting with subject matter experts, determining decision making skills needed by participants and identifying relevant environmental or stress related factors that affect decision making.

10. A method as in claim 9 which includes, responsive to the identifying the plurality of cues, identifying cognitive and intuitive decision making prompts relevant to desired intuitive decision making skills of the participant.

11. A method as in claim 10 where providing includes a multidimensional display and an associated voice communications network.

12. A method as in claim 11 which includes providing a role player's station coupled to the communications network to enable a role player to interact at least audibly with the participant in real-time.

13. A method as in claim 12 which includes circuitry enabling the participant to send and receive communications in real-time in response to the simulated conflict scenario presented, at least in part, visually on the display.

14. The method of claim 1, further comprising generating an assessment of the participant using the assessment methodology.

15. The method of claim 1, wherein the plurality of cues for at least one of the plurality of decision making skills comprises at least an audio cue, a visual imagery cue, and a textual cue.

16. The method of claim 15 wherein the cues include clutter.

17. The method of claim 16 wherein the clutter includes audio and visual cues.

18. The method of claim 1 wherein the cues are developed responsive to the identified cognitive tasks.

19. A method for enhancing and assessing intuitive decision making skills of a participant in a conflict environment via a simulator, the method comprising:
   identifying a plurality of cognitive tasks for a desired training environment;
   selecting a learning model that at least in part identifies an assessment methodology for assessing the participant during a simulated conflict scenario comprising a plurality of simulation events in the training environment, wherein the learning model is selected from candidate learning theories and models based on a needs analysis and mission analysis;
   identifying a plurality of intuitive decision making skills associated with the cognitive tasks, wherein each intuitive decision making skill is assessable based on a decision of the participant upon exposure to a corresponding simulation event of the plurality of simulation events that includes a plurality of cues which are presented to the participant, wherein at least one of the plurality of cues is an audio cue, wherein the intuitive decision making skills are assessable separately from performance of the cognitive tasks by identifying cognitive clues and factors associated with decisions made during performance;
   identifying the plurality of cues associated with the corresponding simulation event based on a plurality of actual cues from a real-world event which is being simulated by the corresponding simulation event;
   responsive to the identifying the plurality of cues, developing an instructional strategy with integrated live, virtual and constructive training interfaces;
   using the instructional strategy, creating multiple difficulty levels of a simulated conflict scenario based on the identified intuitive decision making skills, wherein the levels of simulated conflict scenario are adaptive; and
   providing a plurality of interconnected hardware elements which implements the simulated conflict scenario for the participant.

20. A method for enhancing and assessing decision making skills of a participant in a conflict environment via a simulator, the method comprising:
   identifying a plurality of cognitive tasks for a desired training environment;
   selecting a learning model that at least in part identifies an assessment methodology for assessing the participant during a simulated conflict scenario comprising a plurality of simulation events in the training environment, wherein the learning model is selected from candidate learning theories and models based on a needs analysis and mission analysis;
   identifying a plurality of decision making skills associated with the cognitive tasks, wherein each decision making skill is assessable based on a decision of the participant upon exposure to a corresponding simulation event of the plurality of simulation events that includes a plurality of cues which are presented to the participant, wherein at least one of the plurality of cues is an audio cue, wherein the decision making skills include intuitive decision making skills which are assessable separately from performance of the cognitive tasks;
   identifying the plurality of cues associated with the corresponding simulation event based on a plurality of actual cues from a real-world event which is being simulated by the corresponding simulation event based on interviews of experts who experienced the real-world event;
   responsive to identifying the plurality of cues, developing an instructional strategy;
   using the instructional strategy, creating multiple difficulty levels of a simulated conflict scenario based on the identified decision making skills, wherein the level of difficulty increases as a participant succeeds in scenarios; and
   providing a plurality of interconnected hardware elements to implement the multiple difficulty levels of simulated conflict scenarios to train a participant's decision making skills.

* * * * *